June 2, 1942.                B. HANSSON                  2,284,866
           ARRANGEMENT FOR THE MANUFACTURE OF RUBBER HOSE
                       Filed Dec. 8, 1939
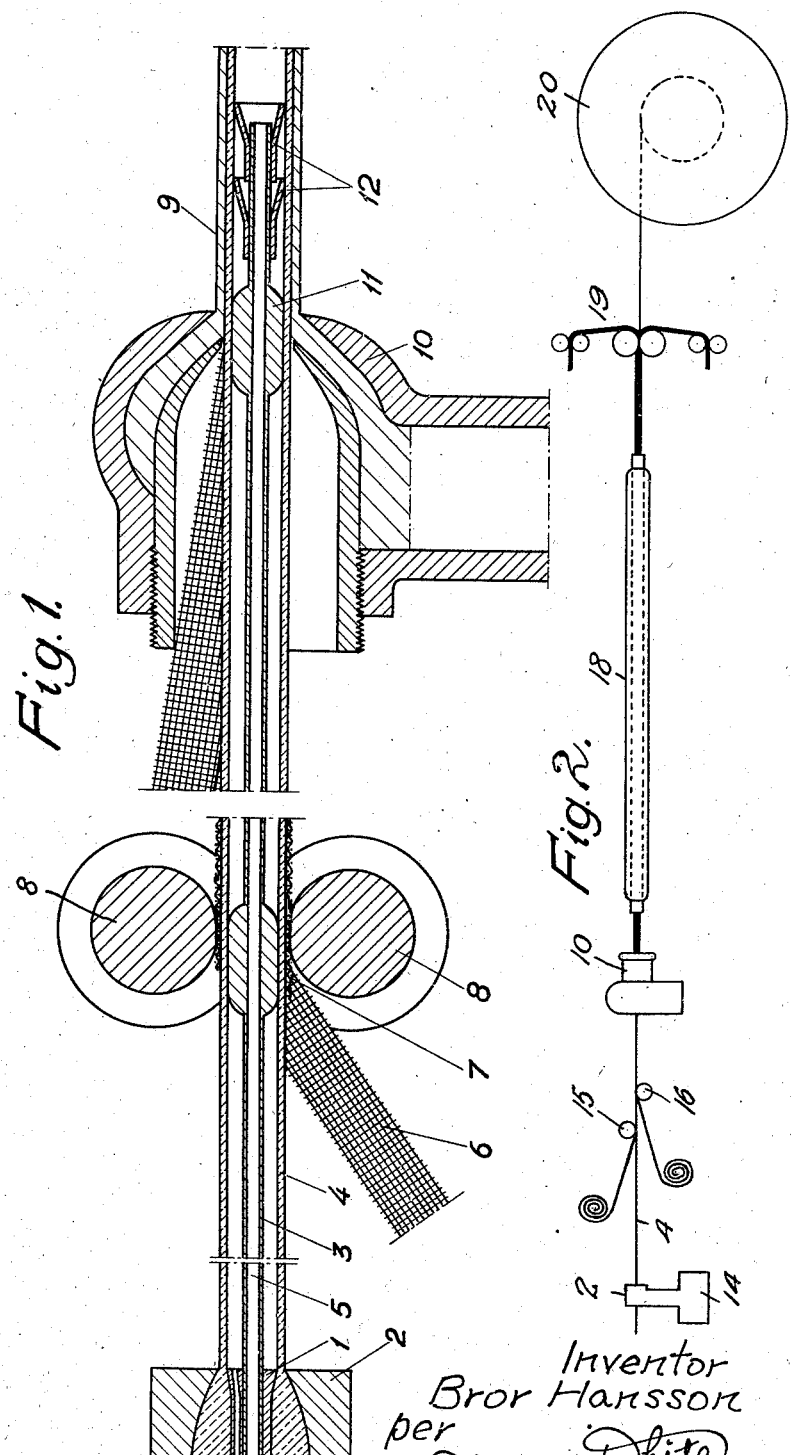

Patented June 2, 1942

2,284,866

UNITED STATES PATENT OFFICE 2,284,866

ARRANGEMENT FOR THE MANUFACTURE OF RUBBER HOSE

Bror Hansson, Stockholm, Sweden

Application December 8, 1939, Serial No. 308,117
In Sweden December 10, 1938

2 Claims. (Cl. 154—6)

The present invention has for its object an improved arrangement for the manufacture of reinforced rubber hose or hose of similar plastic material and is suitable for the continuous manufacturing of hose of unlimited length and of superior strength and finish.

In accordance with certain prior methods of manufacture, the hose has been built up on mandrels of limited length, then vulcanised in expensive vulcanising vessels and later on the hose has been stripped from the mandrel.

According to another method a hose of unvulcanised rubber was first extruded then filled with a pressure medium, then reinforced with textile braiding or taping, then lead covered and then vulcanised, each operation being done separately.

According to the present invention means are provided which make possible a continuous manufacturing process. The hose is continuously extruded over a fixed mandrel. The hose is reinforced with textile braiding or taping, while the hose is moving over the mandrel, which is used as a support during the taping operation and is also used as a support for the pressing of the reinforcing against the hose and also as a support for the means which pulls the hose forward. These means may be rollers, caterpillar tapes or the extruded pipe from a leadpress. When the lead pipe pulls the hose forward, the hose by means of steam, compressed gas or other pressure medium may be pressed against the interior wall of the lead pipe. Means such as, for example, cone shaped rubber packings are arranged to prevent the pressure medium from escaping backwards between the mandrel and the hose.

The accompanying drawing shows by way of example different methods of carrying the invention out in practice.

Fig. 1 is a longitudinal section showing the extruding and reinforcing means, and Fig. 2 is a diagram showing the complete arrangement.

In Fig. 1, the guider 1 and the die 2 form the extrusion opening of a rubber extrusion machine. A hollow mandrel 3 protrudes outside the extrusion machine and although its diameter is smaller than the inside diameter of the extruded hose 4 it serves as a support for this hose. Through a hole 5 in the mandrel soap water or some other lubricant is fed into the hose. A textile tape 6 is wrapped around the hose at a point 7 where the hose is in supporting contact with the mandrel. At this point the mandrel may have a larger diameter corresponding to the inside diameter of the hose. This wrapping operation may be repeated for the application of another tape. A roller 8 or a caterpillar chain or similar arrangement pulls the hose forward using the mandrel as an inner support. According to one form of the apparatus the taping and the pressing arrangements are several, at least two, and distributed along the mandrel. The first taping and pressing arrangement applies the tape on one side and the second on the other, the object of that part of the invention being to prevent the hose from sticking on the mandrel. According to this form of the apparatus, a pipe 9 extruded, for example, from a lead press 10 and round the hose serves as a pulling means for the hose and also as a mould during the vulcanisation, a pressure medium being injected through the hollow mandrel which may have thickenings 11 or in one variety cone shaped rubber packings 12, which prevent the pressure medium from escaping backwards against the processing direction, in which case the hose would burst where it is not reinforced.

Fig. 2 shows in a simplified diagram the whole arrangement. The hose 4 is extruded from the die 2 of the extrusion machine 14, is taped at 15 and 16, lead covered at 10, vulcanised in the heating chamber 18, stripped from lead in the stripping machine 19 and wound onto the take up drum 20.

I claim as my invention:

1. An arrangement for the continuous manufacture of hose of rubber or similar plastic material, comprising an extrusion machine, means for the application of an external reinforcement to the extruded material, means for extruding an external pipe round the hose to serve as an external mould for the hose and as pulling means therefor, and an internal mandrel fixed relatively to the hose extrusion machine and round which the hose is extruded, said mandrel serving as a support for the hose during the reinforcing and extending to a point in the hose where the latter is covered by the external pipe.

2. An arrangement for the continuous manufacture of hose of rubber or similar plastic material, comprising a rubber extrusion machine, means for the application of a reinforcement externally to the extruded material, means for pulling the hose forwardly during the reinforcing, an internal mandrel fixed relatively to the said machine and around which the hose is extruded, said mandrel serving as an internal support for the hose and for the reinforcing and extending to a point in the hose where the latter has sufficient reinforcement to withstand internal pressure, and soft-cone-shaped packing means between the mandrel and the hose to prevent access of internal fluid pressure to any portion of the hose having insufficient reinforcement to withstand such pressure.

BROR HANSSON.